United States Patent
Maue et al.

[11] Patent Number: 5,932,983
[45] Date of Patent: Aug. 3, 1999

[54] WIPER MOTOR CONTROL

[75] Inventors: H. Winston Maue, Farmington Hills; Timothy J. Bomya, Westland, both of Mich.

[73] Assignee: UT Automotive Dearborn, Inc., Dearborn, Mich.

[21] Appl. No.: 09/134,712

[22] Filed: Aug. 14, 1998

[51] Int. Cl.$^6$ .............................. H02P 1/04; G01W 1/14
[52] U.S. Cl. .................... 318/490; 318/434; 318/483; 318/DIG. 2; 73/336.5
[58] Field of Search .................... 318/430–486, 318/DIG. 2, 561, 139; 73/73, 336.5; 324/694; 219/209; 307/117

[56] References Cited

U.S. PATENT DOCUMENTS

| | | | |
|---|---|---|---|
| 3,794,847 | 2/1974 | Cadiou | 307/117 |
| 4,044,287 | 8/1977 | Ratzel et al. | 318/432 |
| 4,090,114 | 5/1978 | Thompson | 318/139 |
| 4,471,278 | 9/1984 | Matouka | 318/561 |
| 4,611,154 | 9/1986 | Lambropoulos et al. | 318/490 |
| 4,812,615 | 3/1989 | Manzoni | 219/209 |
| 4,831,493 | 5/1989 | Wilson et al. | 361/286 |
| 5,040,411 | 8/1991 | Medzius | 73/73 |
| 5,694,812 | 12/1997 | Maue et al. | 9/6 |
| 5,764,010 | 6/1998 | Maue et al. | |
| 5,841,249 | 11/1998 | Zimmer et al. | |
| 5,861,758 | 1/1999 | Berberich | 324/694 |

Primary Examiner—Paul Ip
Attorney, Agent, or Firm—Howard & Howard

[57] ABSTRACT

A wiper motor control using a load sense resistor to monitor conditions confronting the wiper operation. The control can detect if the wiper is frozen to the window, moving too slowly, moving too quickly, etc. The power to the motor is then adjusted to achieve a desired speed, or, otherwise adjusted, based upon the detected conditions. Further, the direction of the motor may be reversed based upon the detected conditions. In a preferred embodiment, the load sense resistor is provided by a defroster filament strip. Alternatively, a temperature sensor may be used to detect the conditions confronting the wiper operation.

18 Claims, 2 Drawing Sheets

LOW SPEED —54
MEDIUM SPEED —56
HIGH SPEED —58

WIPER MOTOR CONTROL

BACKGROUND OF THE INVENTION

This invention relates to a wiper motor control.

Many modern vehicles include a single rear window wiper and a rear window defroster. The wiper arm is moved in a reciprocating motion across the rear window by a wiper motor. However, many environmental factors can effect the movement of the wiper arm and blade. For example, during winter weather, the wiper blade may "freeze" to the rear window. Cold temperatures may lower the battery voltage of the vehicle causing the wiper arm to move at a much slower speed. Hot temperatures can have the opposite effect. Ice covering the rear window may cause the wiper blade to "slide" across the rear window. A large amount of snow may prevent the wiper blade from moving through its entire range of movement. It would be desirable to provide a wiper motor control circuit for managing these conditions.

Most modern vehicles further include a rear window defroster. Typically, the rear window defroster consists of a power switch and a resistive electrical filament strip bonded to the inside of the rear window. One end of the resistive filament is connected to a power source and the opposite end of the resistive filament is connected to ground. When the defroster is switched on, current from the power source flows through the resistive filament to ground thereby warming the filament. The warm filament heats the rear window.

In most modern vehicles, the rear window defroster system and the rear window wiper system are packaged close to each other yet assembled and operated separately. It would be desirable to capitalize upon the packaging proximity and integrate the rear window defroster system and the rear window wiper system to reduce parts, conserve packaging space, decrease cost, and increase reliability. Further, it would be desirable to use the defroster filament strip as both a load sense resistor and a temperature sensor in the wiper motor control circuit.

SUMMARY OF THE INVENTION

In a disclosed embodiment of this invention, a window wiper system includes a power source, a wiper motor receiving power from the power source for rotating in opposite directions, a resistive element electrically connected in series with the wiper motor, and a control for controlling the amount of power from the power source through the wiper motor and the resistive element. The control includes a feedback circuit for sensing a feedback from the resistive element and for adjusting the power to the wiper motor in response to the feedback.

In a preferred embodiment, the resistive element consists of a defroster filament strip attached to a window. The defroster filament strip is operated to warm the window and function as both a load sense resistor and a temperature sensor within the wiper motor control circuit. Alternatively, the defroster filament strip may function as a load sense resistor and a separate temperature sensor may be incorporated into the wiper motor control circuit.

In a preferred embodiment of the present invention, the amount of current through the resistive element during operation of the wiper motor may be monitored to detect a "frozen" motor condition. In a "frozen" motor condition, the wiper blade is frozen to the rear window and, therefore, temporarily unable to move in either of the alternating directions. In response to a "frozen" motor condition, the power to the wiper motor and the direction of the wiper motor are controlled accordingly. Initially, the power to the wiper motor is incrementally increased through pulse width modulation in an attempt to break the wiper blade free from the "frozen" condition. If at maximum pulse width modulation the motor remains "frozen", the direction of the wiper motor is reversed. Power to reverse the wiper motor is then incrementally increased through pulse width modulation in a further attempt to break the wiper blade free from the "frozen" condition. If at maximum pulse width modulation the motor still remains "frozen", the power to the wiper motor is shut off to prevent motor damage.

The amount of current through the resistive element during operation of the wiper motor may also be monitored to detect a premature stall condition caused by environmental factors, such as an accumulation of snow on the rear window. In a premature stall condition, the reciprocating motion of the wiper blade is temporarily blocked by the accumulation of snow and, therefore, the wiper arm is unable to complete a full sweep. In response to a premature stall condition, the power to the wiper motor and the direction of the wiper motor are controlled accordingly. Initially, the power to the wiper motor is incrementally increased through pulse width modulation in an attempt to move the accumulated snow out of the full sweep of the wiper arm. If at maximum pulse width modulation the motor remains stalled, the direction of the wiper motor is reversed thereby shortening the sweep of the wiper arm. During successive wiper arm sweeps, the power to the wiper motor is incrementally increased through pulse width modulation in a further attempt to move the accumulated snow completely out of the full sweep of the wiper arm.

Further, the amount of current through the resistive element during operation of the wiper motor may be monitored to determine the condition of the rear window (i.e. dry, covered with water, or covered with ice). In response to a dry rear window, the power to the wiper motor is increased through pulse width modulation to maintain a desired wiper speed. In response to a rear window covered with ice, the power to the wiper motor is decreased through pulse width modulation to maintain the desired wiper speed.

In a preferred embodiment, the resistance of the resistive element may be measured prior to operation of the wiper motor to determine the temperature of the window. In response to a freezing temperature, the defroster is automatically activated and the power to the wiper motor is increased through pulse width modulation in anticipation of a "frozen" motor condition and to compensate for a low voltage source.

These and other features of the present invention will be best understood from the following specification and drawings, the following of which is a brief description.

DETAILED DESCRIPTION OF THE PREFERRED EMBODIMENT

Figure 1:
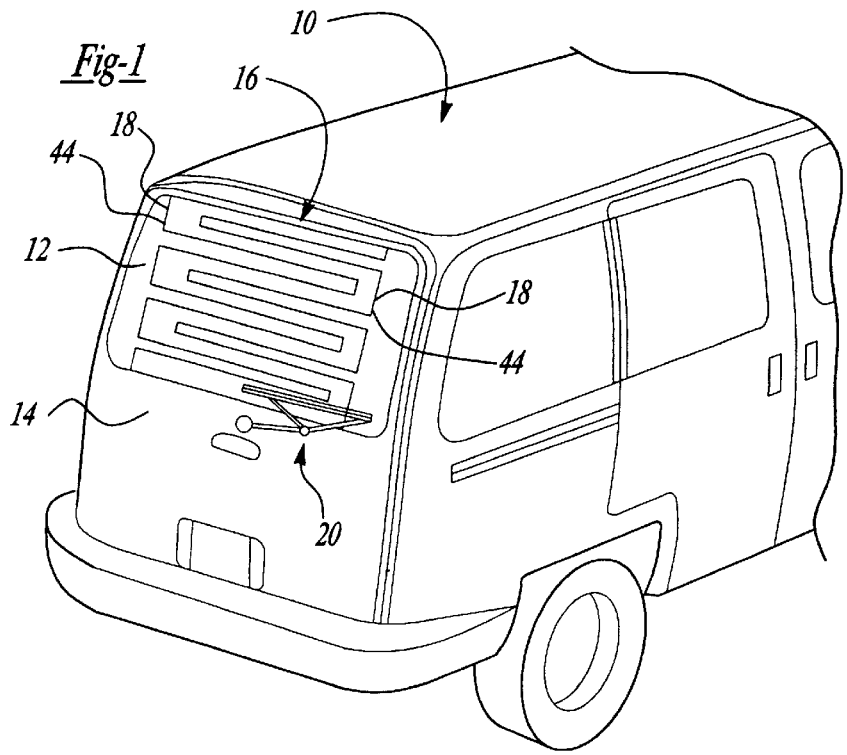
FIG. 1 is a perspective rear view of a vehicle having a rear window wiper and a rear window defroster.

FIG. 1 is a perspective rear view of a vehicle 10 having a rear window 12 and liftgate 14. A rear window defroster 16 consists of at least one resistive electrical element 18 bonded to the rear window 12. As shown, in a preferred embodiment there are two resistive elements 18, each extending repetitively back and forth across the rear window 12. The rear window defroster 16 operates to warm the resistive elements 18 and remove frost, ice, etc. from the rear window 12. To remove rain and snow from the rear window 12, the vehicle 10 further includes a rear window wiper 20.

Figure 2:
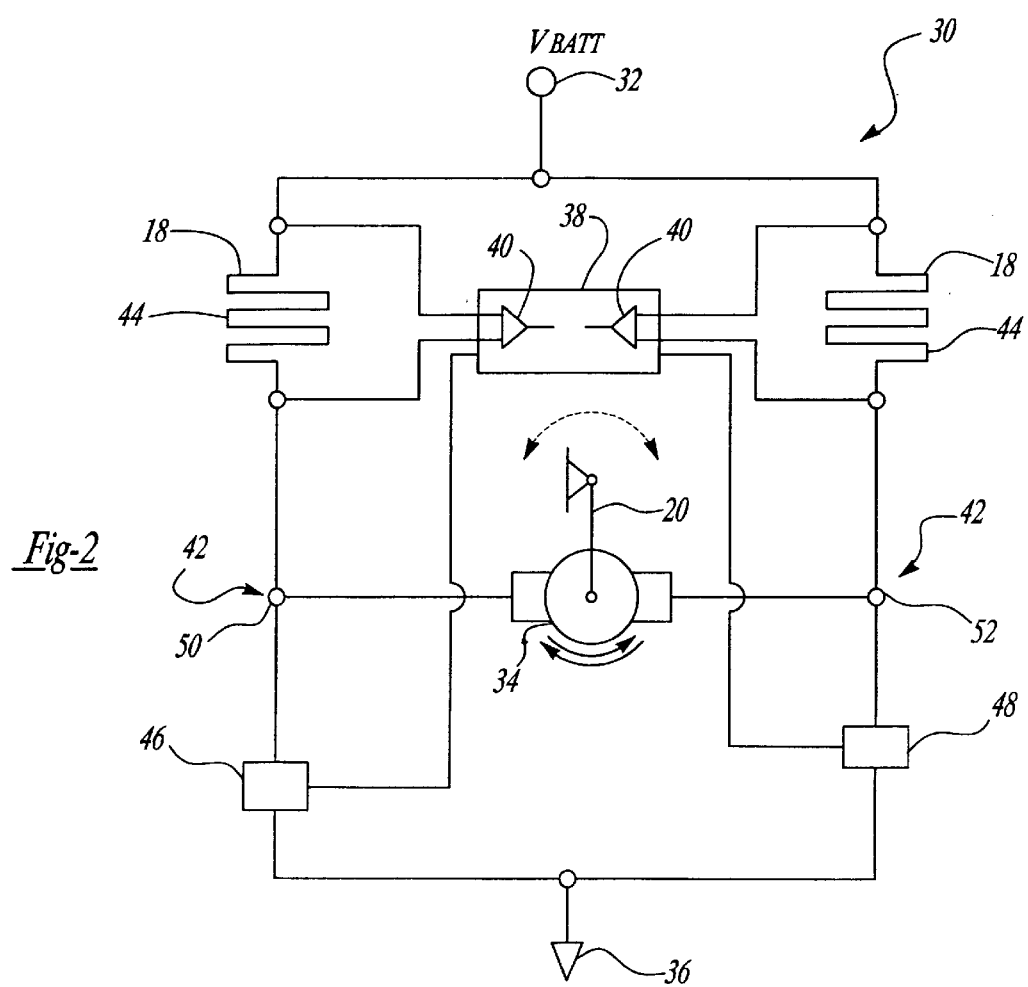
FIG. 2 is an electrical schematic diagram of a first embodiment of a window wiper system in accordance with the present invention for controlling the rear window wiper.

FIG. 2 is an electrical schematic diagram of a first embodiment of a window wiper system 30 in accordance with the present invention for controlling the rear window wiper 20. The window wiper system 30 includes a power source 32, a wiper motor 34 receiving power from the power source 32 for rotating in opposite directions, and a ground 36. The resistive elements 18 are electrically connected in series with the wiper motor 34 and function as both load sense resistors and temperature sensors. The window wiper system 30 further includes a micro-controller 38 for controlling the amount of power from the power source 32 through the wiper motor 34 and the resistive elements 18. The micro-controller 38 includes a feedback circuit 40 for sensing feedback from the resistive elements 18 and for adjusting the power to the wiper motor 34 in response to the feedback.

In a preferred embodiment of the present invention, the resistive elements 18 consists of defroster filament strips 44 bonded to the inside surface of the rear window 12. The defroster filament strips 44 are electrically connected in series with the wiper motor 34 and function as both load sense resistors and temperature sensors. The micro-controller 38 senses feedback from the defroster filament strips 44 and adjusts the power to the wiper motor 34 in response to the feedback. The defroster filament strips 44 preferably extend repetitively back and forth across the rear window 12 as shown in FIG. 1.

As shown in FIG. 2, the wiper motor 34 of window wiper system 30 is a bi-directional motor which rotates alternately in opposite directions between reversal end points. Each reversal end point is established by an electrical contact switch for signaling that the motor has been rotated to the predetermined reversal end point. The arm of the rear window wiper 20 is moved or swept in a reciprocating motion across the rear window 12 by the wiper motor 34. One of ordinary skill in the art will recognize the wiper motor 34 may be a D.C. permanent magnet fractional horsepower motor used to operate the rear window wiper 20. One such motor is known which not only drives the rear window wiper 20 but also locks and unlocks the liftgate 14 and releases the rear window 12. However, this invention extends to simple wiper motor controls. The wiper motor 34 is driven in alternating opposite directions with a H-bridge drive 42. The H-bridge drive 42 is used to apply current from the power source 32 in alternating opposite directions across the wiper motor 34 to ground 36.

The micro-controller 38 controls the path of current from the power supply 32 through the resistive elements 18 or 44 and the wiper motor 34 to drive the wiper motor 34 in the alternating opposite directions. A pair of normally-open switches 46 and 48 are electrically connected in series between each wiper motor/resistive element splice 50 and 52 and ground 36 respectively for selectively switching opposite ends of the wiper motor 34 to ground 36. The micro-controller 38 is electrically connected to the switches 46 and 48 to selectively close each of the switches 46 and 48. When both switches 46 and 48 are open, neither the defroster nor rear wiper is activated. To operate the defroster only, the micro-controller 38 closes both switches 46 and 48. To run the wiper motor 34 in a clockwise direction, the micro-controller 38 closes only switch 48. With only switch 48 closed, one half of the defroster function is activated. To run the wiper motor 34 in a counter-clockwise direction, the micro-controller 38 closes only switch 46. With only switch 46 closed, the other half of the defroster function is activated. Thus, any time current is run through one resistive element 18 or 44, that resistive element 18 or 44 warms and defrosts the rear window 12.

In a preferred embodiment of the present invention, the micro-controller 38 is programmed to activate the full defroster function by closing both switches 46 and 48 during the pause portion of an intermittent wipe sequence. When both switches 46 and 48 are closed, the wiper motor 34 is dynamically braked. In this condition, both defroster filament strips 44 are electrically placed in parallel to achieve the full defroster function.

The H-bridge drive 42 consists of five leg portions. The first leg consists of the resistive element 18 or 44 connected between the power source 32 and the splice 50; the second leg consists of the resistive element 18 or 44 connected between the power source 32 and the splice 52; the third leg consists of the switch 46 connected between the splice 50 and ground 36; the fourth leg consists of the switch 48 connected between the splice 52 and ground 36; and the fifth leg consists of the wiper motor 34 connected between the splices 50 and 52. The design of the disclosed H-bridge drive 42 requires that a power or current dissipating resistance be connected in series between the power source 32 and the wiper motor 34 to prevent a short circuit during operation of the rear window wiper 20. Specifically, the resistive element 18 or 44 connected between the power source 32 and the splice 50 is necessary to prevent a short circuit when the switch 46 is closed. Similarly, the resistive element 18 or 44 connected between the power source 32 and the splice 52 is necessary to prevent a short circuit when the switch 48 is closed.

The feedback circuit 40 of the micro-controller 38 senses two types of feedback. The first type of feedback is the amount of current through the resistive elements 18 or 44 during operation of the wiper motor 34. The second type of feedback is the resistance of the resistive elements 18 or 44 prior to operation of the wiper motor 34.

To determine the amount of current through the resistive elements 18 or 44 during operation of the wiper motor 34, the feedback circuit 40 of the micro-controller 38 includes signal measuring means for providing a signal representing the amount of current through the resistive elements 18 or 44. In a preferred embodiment of the present invention, the amount of current through the resistive elements 18 or 44 during operation of the wiper motor 34 may be monitored to detect a "frozen" motor condition. In a "frozen" motor condition, the blade of the wiper 20 is frozen to the rear window 12 and, therefore, temporarily unable to move in either of the alternating directions. In response to a "frozen" motor condition, the power to the wiper motor 34 and the direction of the wiper motor 34 are controlled accordingly. Initially, the power to the wiper motor is incrementally increased in an attempt to break the wiper blade free from the "frozen" condition. If at maximum power the wiper motor 34 remains "frozen", the direction of the wiper motor 34 is reversed. Power to reverse the wiper motor 34 is then incrementally increased in a further attempt to break the wiper blade free from the "frozen" condition. If at maximum power the wiper motor 34 still remains "frozen", the power to the wiper motor 34 is shut off to prevent motor damage.

The amount of current through the resistive elements 18 or 44 during operation of the wiper motor 34 may also be monitored to detect a premature stall condition caused by environmental factors, such as an accumulation of snow on the rear window 12. In a premature stall condition, the reciprocating motion of the wiper blade is temporarily blocked by the accumulation of snow and, therefore, the wiper arm is unable to complete a full sweep. In response to a premature stall condition, the power to the wiper motor 34 and the direction of the wiper motor 34 are controlled accordingly. Initially, the power to the wiper motor 34 is incrementally increased in an attempt to move the accumulated snow out of the full sweep of the wiper arm. If at maximum power the wiper motor 34 remains stalled, the direction of the wiper motor 34 is reversed thereby shortening the sweep of the wiper arm. During successive wiper arm sweeps, the power to the wiper motor 34 is incrementally increased in a further attempt to move the accumulated snow completely out of the full sweep of the wiper arm.

To control the power to the wiper motor 34 and the direction of the wiper motor 34 when a "frozen" motor or premature stall is detected, the micro-controller 38 separates the amount of current through the resistive elements 18 or 44 into first and second groups. The first group represents an amount of current which indicates a stalled motor condition. The second group represents an amount of current which indicates an overloaded motor condition. In response to a stalled motor condition, the micro-controller 38 increases the power to the wiper motor 34. In response to an overloaded motor condition, the micro-controller 38 either shuts off the power to the wiper motor 34 or switches the direction of the power across the wiper motor 34 to reverse the direction of the wiper motor 34.

Further, the amount of current through the resistive elements 18 or 44 during operation of the wiper motor 34 may be monitored to determine the condition (i.e. dry, covered with water, or covered with ice) of the rear window 12. In response to a dry rear window 12, the power to the wiper motor 34 is increased to maintain a desired wiper speed. In response to a rear window 12 covered with ice, the power to the wiper motor 34 is decreased to maintain the desired wiper speed.

To determine the condition of the rear window 12, the micro-controller 38 separates the amount of current through the resistive elements 18 or 44 into first and second ranges. The first range represents a load on the operation of the wiper motor 34 above a predetermined level. The second range represents a load on the operation of the wiper motor 34 below the predetermined level. The micro-controller 38 increases power to the wiper motor 34 in response to an amount of current in the first range and decreases power to the wiper motor 34 in response to an amount of current in the second range. In a preferred embodiment of the present invention, the first range may be used to indicate a dry rear window 12 and the second range may be used to indicate a rear window 12 covered with ice. Accordingly, the micro-controller 38 would increase power to the wiper motor 34 when the rear window 12 was dry and decrease power to the wiper motor 34 when the rear window 12 was covered with ice. This will maintain the speed of the wiper arm within a desired range.

To determine the resistance of the resistive elements 18 or 44 prior to operation of the wiper motor 34, the feedback circuit 40 of the micro-controller 38 includes signal measuring means for providing a signal representing the resistance of the resistive elements 18 or 44. The temperature of the rear window 12 may be obtained by referencing the signal against a resistance versus temperature chart. In this manner, the micro-controller 38 calculates the temperature of the rear window 12.

The micro-controller 38 increases power to the wiper motor 34 in response to a range of calculated temperatures. If the temperature is below freezing (0° C. or 32° F.), the wiper blade may be frozen to the rear window 12. Accordingly, the micro-controller 38 responses to the freezing temperature reading by anticipating a "frozen" motor condition and increasing power to the wiper motor 34 in an attempt to break the frozen wiper blade free from the rear window 12. Further, in a preferred embodiment of the present invention, the micro-controller 38 provides current from the power source 32 to the resistive elements 18 or 44 prior to operation of the wiper motor 34 in response a freezing temperature reading. In this manner, the micro-controller 38 automatically activates the rear window defroster if the temperature is near or below freezing. As an alternative, the temperature could be determined with a separate temperature sensor.

Figure 3:
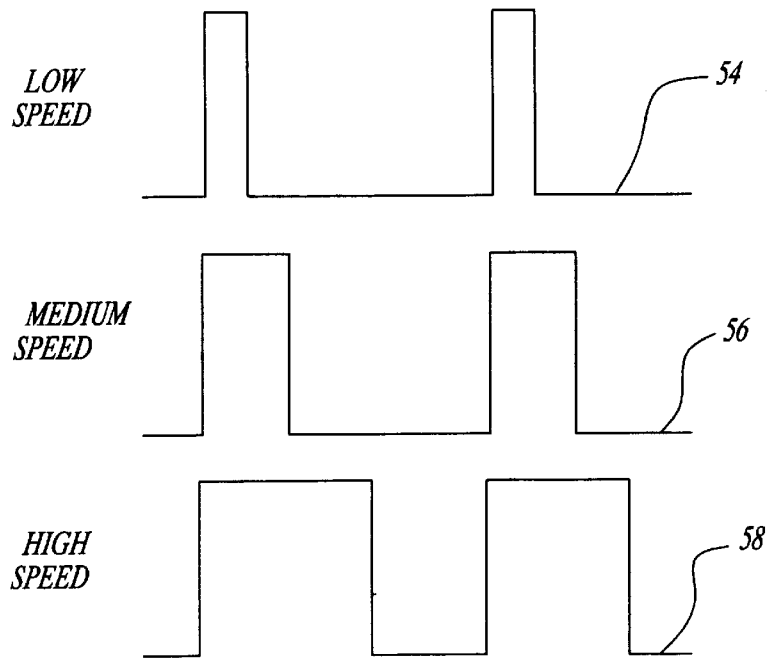
FIG. 3 shows three PWM power signals to operate the wiper motor at low, medium, and high speeds.

The micro-controller 38 adjusts the power to the wiper motor 34 using pulse width modulation (PWM) to control the speed of the wiper motor 34 as required to manage the conditions identified by the above feedback circuit 40. As shown in FIG. 2, the window wiper system 30 includes normally-open switches 46 and 48 electrically connected in series with the ground 36. To pulse width modulate power from the power source 32 to the wiper motor 34 and the resistive elements 18 or 44, the micro-controller 38 cyclically opens and closes the switches 46 and 48. FIG. 3 shows three PWM signals. The first PWM signal 54 represents a power signal calculated to operate the wiper motor 34 at a low speed. The second PWM signal 56 represents a power signal calculated to operate the wiper motor 34 at a medium speed. The third PWM signal 58 represents a power signal calculated to operate the wiper motor 34 at a high speed. One of ordinary skill in the art will recognize that the switches 46 and 48 may consist of a solid state device, such as a MOSFET (metal oxide semiconductor field-effect transistor), a bi-polar transistor, or the like.

Figure 4:
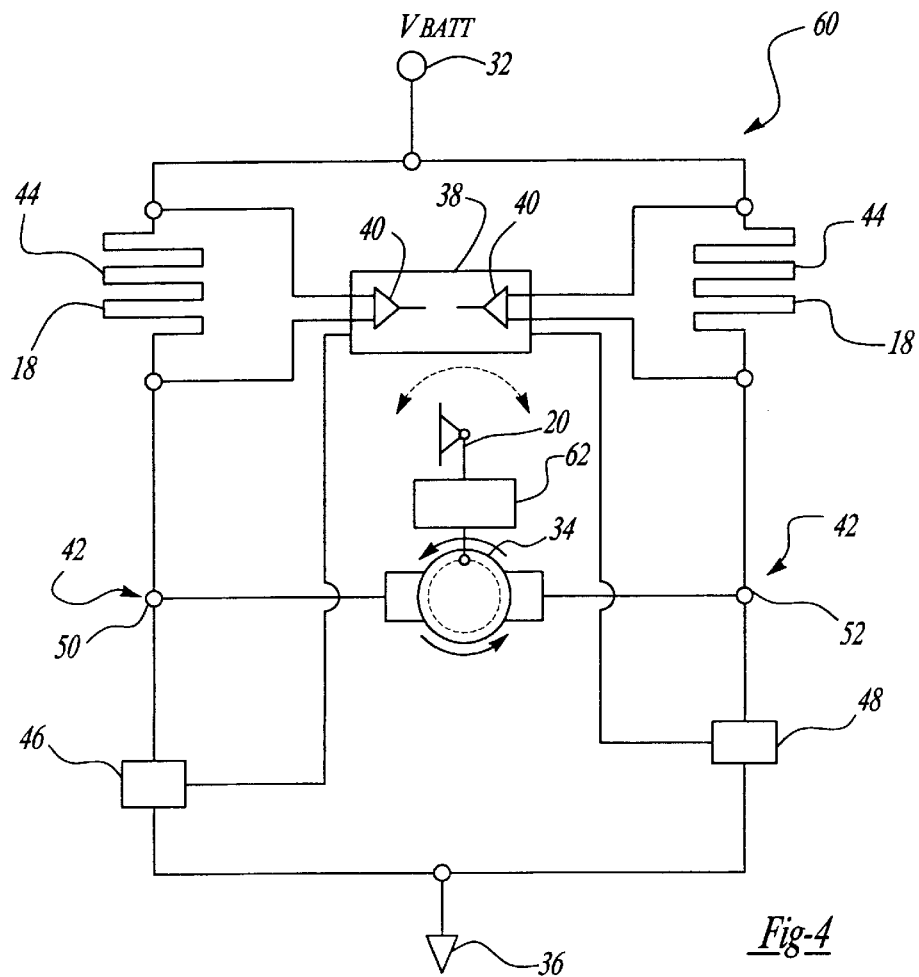
FIG. 4 is an electrical schematic diagram of a second embodiment of a window wiper system in accordance with the present invention for controlling the rear window wiper.

FIG. 4 is an electrical schematic diagram of a second embodiment of a window wiper system 60 in accordance with the present invention for controlling the rear window wiper 20. The second embodiment 60 includes all of the components of the first embodiment 30 as described above. Accordingly, the second embodiment 60 can performed all of the functions associated with the first embodiment 30 as described above.

The window wiper system 60 further includes a four bar linkage 62 connected between the wiper motor 34 and the arm of the rear window wiper 20. The four bar linkage 62 is of a conventional design and thus driven by the wiper motor 34. The window wiper system 60 operates by continuously rotating the wiper motor 34 in one direction, such as the counter-clockwise direction as shown in FIG. 4. To rotate the wiper motor 34 in the counter-clockwise direction, the micro-controller 38 provides power from the power source 32 across the wiper motor 34 by closing switch 48. In this manner, current from the power source 32 flows through the resistive element 18 or 44, connected between the power source 32 and the splice 50, through the wiper motor 34 through the closed switch 48 to ground 36. In response to the continuous single direction rotation of the wiper motor 34, the four bar linkage 62 drives or sweeps the wiper arm in a reciprocating motion across the rear window 12. However, it may be necessary to reverse the direction of the wiper arm in response to a "frozen" motor condition or a premature stall condition. Thus, to reverse the direction of the wiper arm, the micro-controller 38 switches the direction of the power or current flow across the wiper motor 34 by opening switch 48 and closing switch 46. This rotates the wiper motor 34 in the clockwise direction thereby causing the four bar linkage 52 to reverse the direction of the wiper arm. As described above, the direction of the wiper arm may be reversed in an attempt to break the wiper blade free from a "frozen" condition or to shorten the sweep of the wiper arm to avoid a premature stall condition caused by, for example, an accumulation of snow within the sweep of the wiper arm on the rear window 12.

The above described control functions can be achieved by known components and/or software. It is the control functions and features which are the main inventive aspects of the control.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A window wiper system comprising:
   a power source;
   a wiper motor receiving power from said power source for rotating in opposite directions;
   a resistive element electrically conneted in series with said wiper motor, said resistive element being a defrost filament strip attached to a window;
   a control for controlling the amount of power from said power source through said wiper motor and said resistive element;
   said control including a feedback circuit for sensing a feedback from said resistive element and for adjusting the power to said wiper motor in response to said feedback.

2. A window wiper system as set forth in claim 1 wherein said feedback circuit provides a resistance signal representing the resistance of said resistive element prior to operation of said wiper motor.

3. A window wiper system as set forth in claim 1 wherein said control adjusts the power to said motor through pulse width modulation.

4. A window wiper system comprising:
   a power source;
   a wiper motor receiving power from said power source for rotating in opposite directions;
   a resistive element electrically connected in series with said wiper motor; and
   a control for controlling the amount of power from said power source through said wiper motor and said resistive element;
   said control including a feedback circuit for sensing a feedback from said resistive element and for adjusting the power to said wiper motor in response to said feedback;
   said feedback circuit providing a signal representing the amount of current through said resistive element during operation of said wiper motor, and being utilized to reach a determination of the load on said motor.

5. A window wiper system as set forth in claim 4 wherein said resistive element consists of a defroster filament strip attached to a window.

6. A window wiper system as set forth in claim 4 wherein said control separates the amount of said current into first and second groups with said first group representing a stalled motor condition and said second group representing an overloaded motor condition and for increasing the power to said wiper motor in response to said first group.

7. A window wiper system as set forth in claim 6 wherein said control shuts off the power to said wiper motor in response to said second group.

8. A window wiper system as set forth in claim 6 wherein said control switches the direction of the power across said wiper motor to reverse the direction of said motor in response to said second group.

9. A window wiper system as set forth in claim 8 wherein said wiper motor is a bi-directional motor having a pair of reversal end points and said control switches the direction of the power across said motor to reverse the direction of said motor in response to one of said end points.

10. A window wiper system as set forth in claim 8 wherein said wiper motor is a bi-directional motor rotated in one direction and including a four bar linkage connected to said motor for rotating alternately in opposite directions.

11. A window wiper system as set forth in claim 4 wherein said control separates the amount of said current into first and second ranges with said first range representing a load on the operation of said wiper motor above a predetermined level and said second range representing a load on the operation of said wiper motor below said predetermined level and for increasing the power to said wiper motor in response to said first range and for decreasing the power to said wiper motor in response to said second range.

12. A window wiper system comprising:
   a power source;
   a wiper motor receiving power from said power source for rotating in opposite directions;
   a resistive element electrically connected in series with said wiper motor;
   a control for controlling the amount of power from said power source through said wiper motor and said resistive element;
   said control including a feedback circuit for sensing a feedback from said resistive element and for adjusting the power to said wiper motor in response to said feedback;
   said feedback circuit providing a resistant signal representing the resistance of said resistive element prior to operation of said wiper motor; and
   said control calculates a temperature reading from said resistance.

13. A window wiper system as set forth in claim 12 wherein said control increases the power to said wiper motor in response to a freezing temperature reading.

14. A window wiper system as set forth in claim 12 wherein said control provides current from said power source to said resistive element prior to said operation of said wiper motor in response to a freezing temperature reading.

15. A method for controlling a window wiper system including a power source and a wiper motor receiving power from the power source, the method comprising the steps of:

1) providing a feedback element into the window wiper system to provide feedback of the condition of the wiper, said feedback being indicative of the load on a motor for said wiper;

2) sensing feedback from the feedback element; and 3) adjusting the power to the wiper motor in response to the feedback.

16. A method as recited in claim 15 including the step of using pulse width modulation to adjust the power in step 3).

17. A method as recited in claim 15 wherein the feedback element is a temperature sensor.

18. A method as recited in claim 15 wherein the feedback element is a load sense resistor, and step 2) includes sensing the current flow through the resistor.

* * * * *